(12) United States Patent
Al-Zahrani

(10) Patent No.: US 8,039,422 B1
(45) Date of Patent: Oct. 18, 2011

(54) METHOD OF MIXING A CORROSION INHIBITOR IN AN ACID-IN-OIL EMULSION

(75) Inventor: Ali A. Al-Zahrani, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 12/842,201

(22) Filed: Jul. 23, 2010

(51) Int. Cl.
*C09K 8/528* (2006.01)
*E21B 43/28* (2006.01)
*C23G 1/04* (2006.01)
*B01F 3/08* (2006.01)

(52) U.S. Cl. ....... 507/90; 166/305.1; 166/307; 166/376; 507/239; 507/244; 507/252; 507/255; 507/266; 507/933; 507/934; 516/20; 516/21; 516/22; 516/25; 516/200; 516/203

(58) Field of Classification Search ............. 507/90, 507/239, 244, 252, 255, 266, 933, 934; 166/305.1, 166/307, 376; 516/20, 21, 22, 25, 27, 200, 516/203
See application file for complete search history.

(56) References Cited

U.S. PATENT DOCUMENTS

| 1,922,154 | A | 8/1933 | deGroote |
| 2,802,531 | A | 8/1957 | Cardwell et al. |
| 3,044,549 | A | 7/1962 | Jones |
| 3,353,603 | A | 11/1967 | Knight |
| 3,681,240 | A | 8/1972 | Fast |
| 3,779,916 | A | 12/1973 | Crowe |
| 3,917,535 | A | 11/1975 | Crowe |
| 3,962,102 | A | 6/1976 | Crowe |
| 4,359,391 | A | 11/1982 | Salathiel et al. |
| 4,621,694 | A | 11/1986 | Wilson et al. |
| 4,964,468 | A | 10/1990 | Adams et al. |
| 5,027,901 | A | 7/1991 | French et al. |
| 5,034,140 | A | 7/1991 | Gardner et al. |
| 5,753,596 | A | 5/1998 | Martin et al. |
| 6,464,009 | B2 | 10/2002 | Bland et al. |
| 6,581,687 | B2 | 6/2003 | Collins et al. |
| 7,354,886 | B2 | 4/2008 | Bland et al. |
| 2003/0104950 | A1 * | 6/2003 | Frenier et al. ............ 507/200 |
| 2006/0166835 | A1 | 7/2006 | Yang et al. |

* cited by examiner

*Primary Examiner* — Timothy J. Kugel
(74) *Attorney, Agent, or Firm* — Abelman, Frayne & Schwab

(57) ABSTRACT

An acid-in-oil emulsion having a corrosion inhibitor as the external phase has been found to prevent downhole corrosion when acidizing carbonate formations to enhance hydrocarbon recovery.

4 Claims, 3 Drawing Sheets

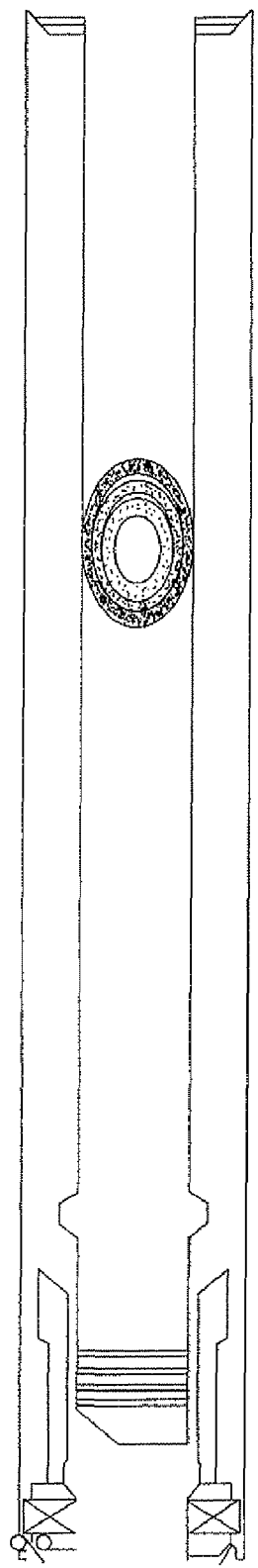
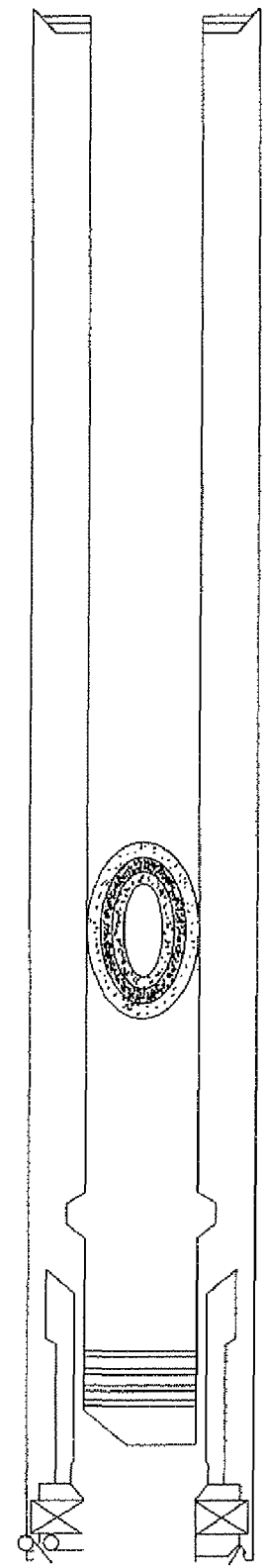
FIG. 1
PRIOR ART
FIG. 2

US 8,039,422 B1

METHOD OF MIXING A CORROSION INHIBITOR IN AN ACID-IN-OIL EMULSION

FIELD OF THE INVENTION

The present invention provides a method of enhancing the corrosion inhibition of well-tubing while using an acid-in-oil emulsion downhole in a hydrocarbon recovery or delivery system and, more particularly, provides a method for acid stimulating a carbonate formation while simultaneously protecting the well-tubing more efficiently.

BACKGROUND OF THE INVENTION

Acid-in-oil emulsions are typically used to stimulate or enhance hydrocarbon production in existing carbonate reservoir rock formations, such as limestone, dolomite or calcareous-magnesium. Typically, the emulsified acid enters the formation and where employed successfully creates a barrier causing the acid to release slowly at a distance from the well-bore. The reaction of the released acid with the formation rock takes place simultaneously at different places inside the formation, resulting in channels that are joined together to form continuous wormholes. When pumping the acid-in-oil emulsions through steel tubing and piping, a corrosion inhibitor is usually added to reduce the corrosive effects of the acid. In operation, the corrosion inhibitor coats the steel surfaces as the emulsion is pumped into the well-bore and the surrounding rock.

In current practice, the oil emulsion consists of two phases. They are the internal phase formed of acid with corrosion inhibitor added to it, and the external phase formed of oil with an emulsifier. The currently employed ratio used in the field is 30% oil and 70% acid. Acid-in-oil emulsions are prepared by mixing the oil with an emulsifier and then gently adding the acid which has been mixed with the corrosion inhibitor to the emulsified oil phase. The oil is known as the disperse phase and the mixture of acid and corrosion inhibitor as the inner phase.

Thus, the corrosion inhibitor which is dissolved in the acid phase is encapsulated by the oil which contains the emulsifier. The corrosion inhibitor, accordingly, is disposed internally with the emulsion droplet which limits its ability to readily disperse on the metal surfaces to create a protective film.

Groote, U.S. Pat. No. 1,922,154 was the first to disclose the use of emulsified acid in the oil industry. Groote discloses removal of formation damage from carbonate rocks with an aqueous acid solution emulsified in a suitable medium that effectively protects the metallic parts of the well from damage by the acid in the solution, while the solution is being pumped into the well. Groote employed hydrochloric acid, nitric acid and a mixture of the two acids to prepare his emulsion. Crude oil and coal tar distillates, such as naphtha and carbon tetrachloride were used as dispersing fluids. Sulfonic acid was used as the emulsifying agent. The feature described in the '154 patent put the pairing the emulsion as similar to current oil field practices. Approximately 2% to 5% of the emulsifying agent is added to crude oil which forms continuous phase and the acid containing the corrosion inhibitor is added to the mixture at a ratio of 33.3% acid to 66.7 parts of crude oil by volume ratio.

Bland, U.S. Pat. No. 7,354,886 discloses the transfer of a corrosion agent downhole by encapsulating it in three phases to release it at the target zone.

U.S. Pat. No. 6,464,009 discloses a method of delivering and releasing a corrosion inhibitor downhole by a pumpable composition consisting of multiple phases.

Martin et al. U.S. Pat. No. 5,753,596 discloses a method of mixing corrosion inhibitor consisting of incorporating thiophosphates consisting of both oxygen and sulfur, pyrophosphates, containing both oxygen and sulfur or a mixture into an oil phase of an emulsion.

French, et al. (U.S. Pat. No. 5,027,901) discloses a method of mixing a corrosion inhibitor, adding it to a discontinuous phase (kerosene) and pumping this discontinuous phase to the well annuals before mixing with a continuous phase (produced water) inside the well.

SUMMARY OF THE INVENTION

The present invention provides a method to enhance hydrocarbon recovery when acidizing a well-bore in a carbonate formation and to inhibit the corrosion of oil well-tubing by using an acid-in-oil emulsion.

By the method of the present invention, an acid is added initially to an emulsified oil so that only the acid is contained within the oil. The corrosion inhibitor is then added to the acid-in-oil emulsion and mixed with it so that it forms the external phase, with the acid in the emulsified oil forming the internal phase. The disposition of the corrosion inhibitor in the external phase of the emulsion enhances its ability to contact and dispense on the metal surfaces of the oil-well tubing in a much more efficient manner as the emulsion is delivered by pumping downwardly into the formation. Thus, when a droplet of the acid-in-oil emulsion of the present invention is viewed in cross-section, the innermost phase is the acid which is encapsulated by the oil and the corrosion inhibitor forms the external phase.

Accordingly, the corrosion inhibitor of the present invention must be immiscible with the acid, but, instead, will mix with the entire emulsion from the outside to form an external phase. The corrosion inhibitor functions by adsorbing onto the surfaces of the coil tubing and the well tubing providing a protective barrier between it and the acid. The presence of the corrosion inhibitor in the external phase of the emulsion expedites the adsorption of the corrosion inhibitor onto the steel surfaces to protect the well tubing.

Accordingly, it is an object of the present invention to provide an improved method for delivering a corrosion inhibitor to the steel surfaces of downhole tubing to protect them from attack by acids which are pumped downhole during an enhanced hydrocarbon recovery operation.

It is another object of the present invention to increase the adsorption of the corrosion inhibitor onto the metal surfaces of the coil tubing and the well tubing more efficiently.

These and other objects will be apparent to those of ordinary skill in the art from the following drawings and the following detailed description of the invention.

BRIEF DESCRIPTION OF THE DRAWINGS

FIG. 1 is a schematic representation of an acid-in-oil emulsion in accordance with the prior art;

FIG. 2 is a schematic representation of the acid-in-oil emulsion in accordance with the present invention;

DETAILED DESCRIPTION OF THE INVENTION

In accordance with the method of the present invention, an emulsifier which can be ionic or non-ionic is employed. For example, it is preferred to employ alkoxylated amines, glycols, alcohols, substituted phenols, long chain amides, or sulfonic acid, or, indeed, any suitable emylsifying agent, which when added to crude oil or a coal tar distillate, such as naphtha, gasoline, kerosene or carbon tetrachloride, and suitably mixed, will form an emulsion. The quantity of emulsifier employed should provide a relatively stable, non-separating emulsion.

An acid, such as hydrochloric acid, or a mixture of hydrochloric acid with formic or acetic acid is then mixed with an oil-containing emulsifier to form an acid-in-oil emulsion. Thus, the acid is contained or encapsulated within the oil.

Thereafter, a suitable corrosion inhibitor, such as primary, secondary or tertiary monoamines; polyethoxylated amines; diamines and amides and their salts; and imidazolines may be used provided they are miscible with the acid employed, whether HCl or mixtures thereof with acetic or formic acids, and which will, when mixed with the emulsion, form the external phase of the emulsified oil.

FIG. 1 depicts a single drop in cross-section of a representative acid-in-oil emulsion according to the prior art. The oil forms the external phase while the corrosion inhibitor which is disposed internally of the drop mixes with the acid in the internal phase of the emulsion, thus preventing the corrosion inhibitor from dispersing on the well-tubing to build-up a corrosion protective coating.

The acid-in-oil emulsion of the present invention depicted in FIG. 2 in cross-section as a discrete drop, has the acid in the internal phase encapsulated by the oil, and the corrosion inhibitor forms the external phase surrounding the acid-in-oil emulsion. The oil phase, in effect, forms a barrier between the corrosion inhibitor and the acid to avoid contact between them. Thus, the emulsion prepared in accordance with the method of the present invention allows the corrosion inhibitor to mix with the emulsion from the outside. The corrosion inhibitor is thus able to disperse directly onto the well tubing by forming a corrosion protective film thereon.

Figure 3:
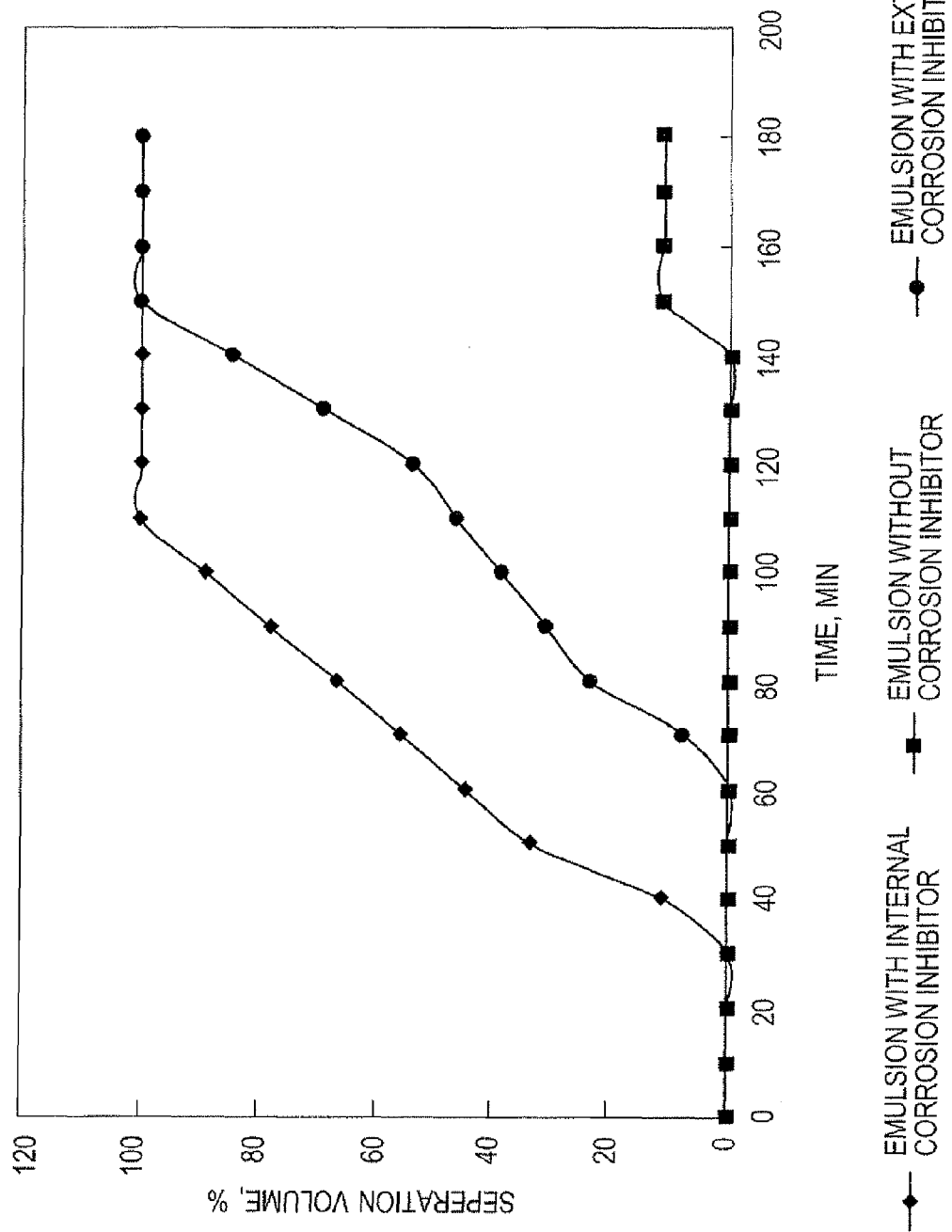
FIG. 3 is a graph demonstrating the separation of the emulsion with an internal corrosion inhibitor in accordance with the present invention, when compared with an external corrosion inhibitor and in the absence of a corrosion inhibitor.
Figure 4:
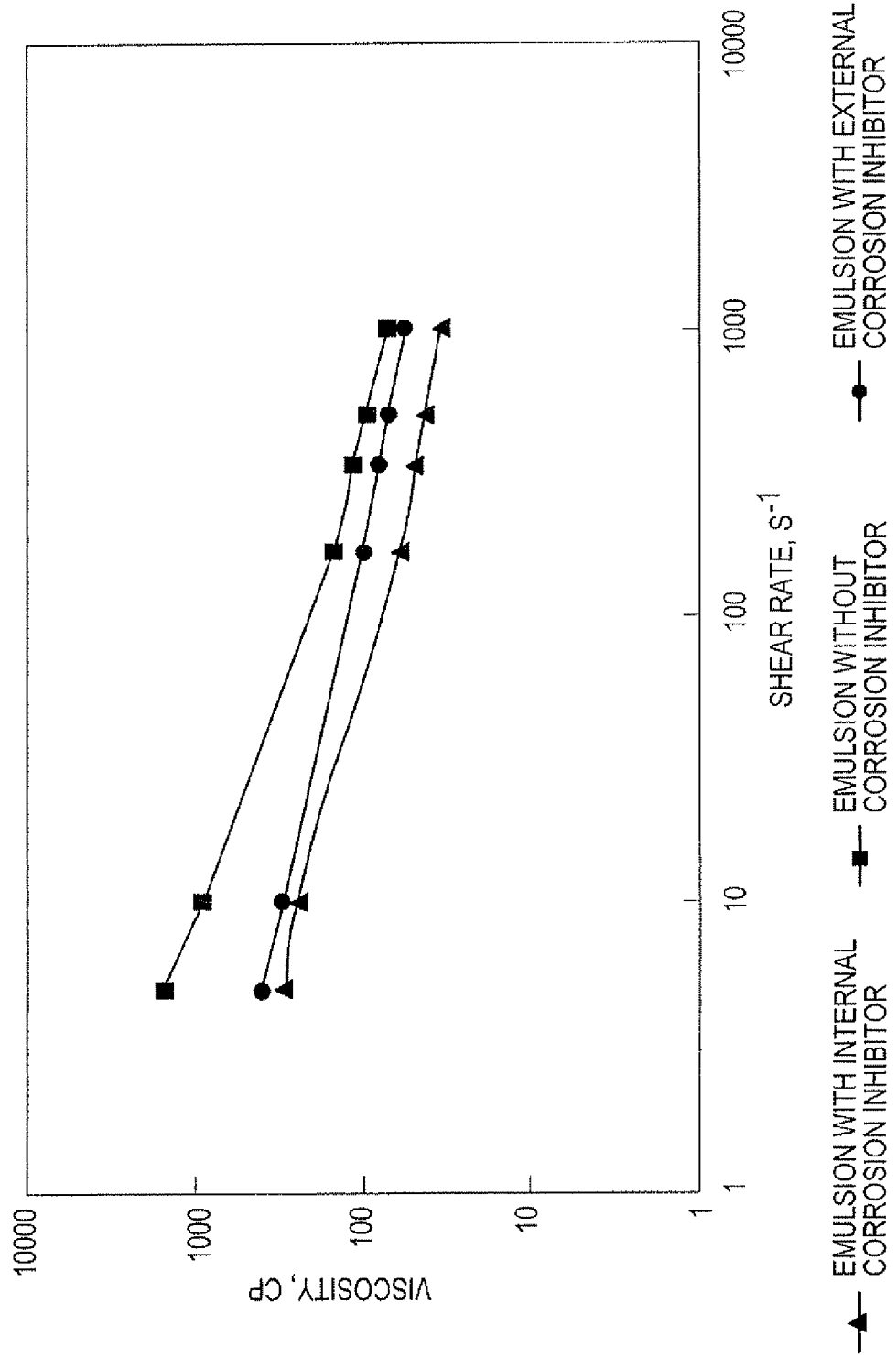
FIG. 4 is a graph comparing the emulsion viscosity at room temperature of an internal corrosion inhibitor in accordance with the present invention, with an external emulsion inhibitor and in the absence of an inhibitor.

In the experiments in accordance with the present invention plotted in FIGS. 2 and 3, 4 gpt of U-080 emulsifying agent (Schlumberger), which is an anionic based surfactant consisting of a mixture of propan—2 (30%-60%), fatty amides (10%-30%) and an alkylamine salt (30%-60%), was mixed with diesel oil at room temperature.

The acid component consisting of 15 wt. % hydrochloric and 9 wt. % acetic acid was gently added to the emulsified diesel oil at a shear rate of 4000 rpm. The ratio of the acid phase to the hydrocarbon phase in the acid-in-oil emulsion was 70% to 30%.

To the acid-in-oil emulsion, 6 gpt of a corrosion inhibitor manufactured by Schlumberger known as A-272 was added. The corrosion inhibitor is an organic acid inhibitor which is cationic based. It contains alkylaryl pyridinium quaternary 40%-70%, alkylthiol 7-13%, methanol 15-40% and ethoxylated alcohol 10%-30%.

A significant advantage of the emulsion of the present invention is its stability over time when compared with the prior art. As can be seen in FIG. 2, the emulsion with the corrosion inhibitor disposed in the inner or internal phase, as taught by the prior art, begins to separate after 30 minutes at a temperature of 248° F. and is completely separated after 100 minutes.

By contrast, when the corrosion inhibitor forms the external phase of the emulsion, in accordance with the present invention, its stability is enhanced since the corrosion inhibitor spreads or disperses on the downhole metal surfaces. In this instance, the breakdown of the emulsion only begins after 60 minutes and takes 140 minutes for complete separation at 248° F. The foregoing is evident from FIG. 2.

When there is no corrosion inhibitor included in the emulsion in the prior art, the breakdown of the emulsion, i.e., its separation, begins after 140 minutes and only 20% is broken down after 180 minutes. Of course, the well tubing and other metals surfaces are not protected from acid attack. This can be seen in FIG. 2.

FIG. 3 demonstrates that the viscosity of the emulsion in accordance with the present invention at a low shear rate is comparable to an emulsion where the corrosion inhibitor is present as an internal phase in accordance with the prior art, and at a high shear rate it is comparable to an emulsion without a corrosion inhibitor being present.

It is evident from the foregoing specification that modifications and changes can be made thereto without departing from the spirit or scope of the invention as set forth in the appended claims. Accordingly, the specification shall be regarded in an illustrative sense, rather than a restrictive sense.

What is claimed is:

1. A method of inhibiting the corrosion of oil-well tubing in a well-bore in a carbonate formation when using acid stimulation to enhance hydrocarbon recovery, which comprises:

mixing an emulsifying agent with a hydrocarbon to form an emulsion;

adding an acid with mixing to the emulsion to form an acid-in-oil emulsion;

adding a corrosion inhibitor to the acid-in-oil emulsion whereby said corrosion inhibitor forms an external phase and the acid is encapsulated as the internal phase of the emulsion; and, delivering said acid-in-oil emulsion to the well-bore whereby the corrosion inhibitor in its external phase disperses on the well-tubing and the acid in the emulsion stimulates hydrocarbon recovery from the carbonate formation.

2. The method according to claim 1, wherein the emulsifying agent is selected from the group consisting of a amides, alkoxylated amines, glycols, alcohols, substituted phenols, and sulfonic acid.

3. The method according to claim 1, wherein the corrosion inhibitor is selected from the group consisting of primary, secondary and tertiary monoamines; amides; polyethoxylated amines, diamines, and their salts and imidazolines.

4. The method according to claim 1, wherein the acid is selected from the group consisting of hydrochloric acid, acetic acid, formic acid and mixture thereof.

* * * * *